No. 809,115. PATENTED JAN. 2, 1906.
A. A. C. KLINT.
MILK STRAINER.
APPLICATION FILED APR. 6, 1905.
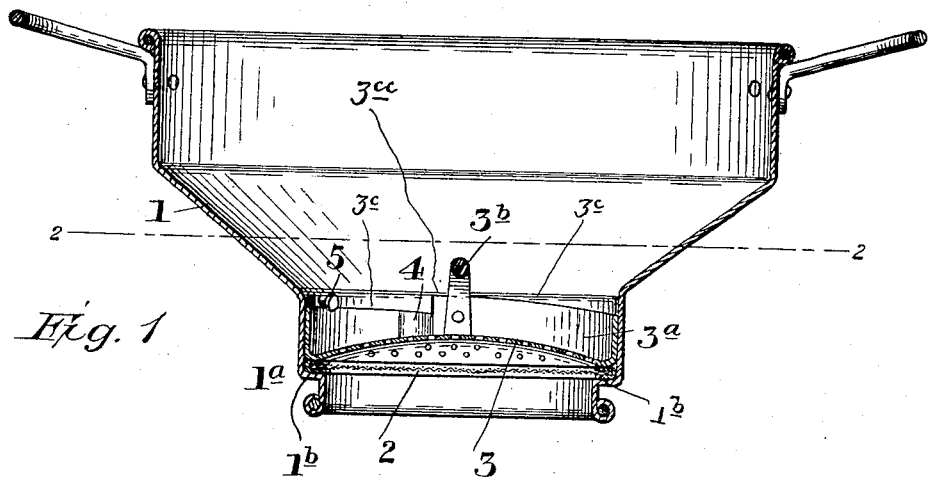
Fig. 1.
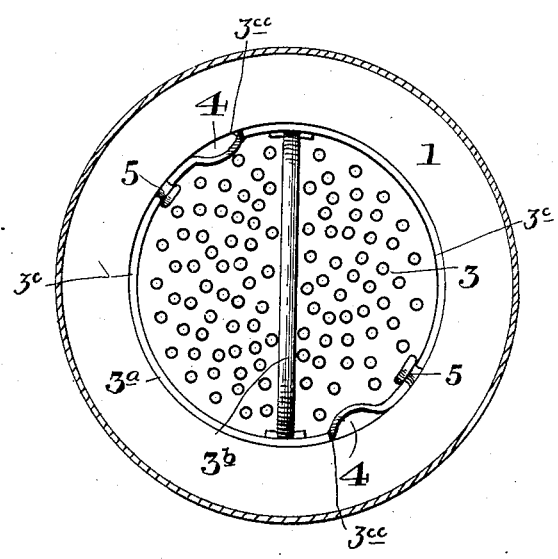
Fig. 2.
Fig. 3.
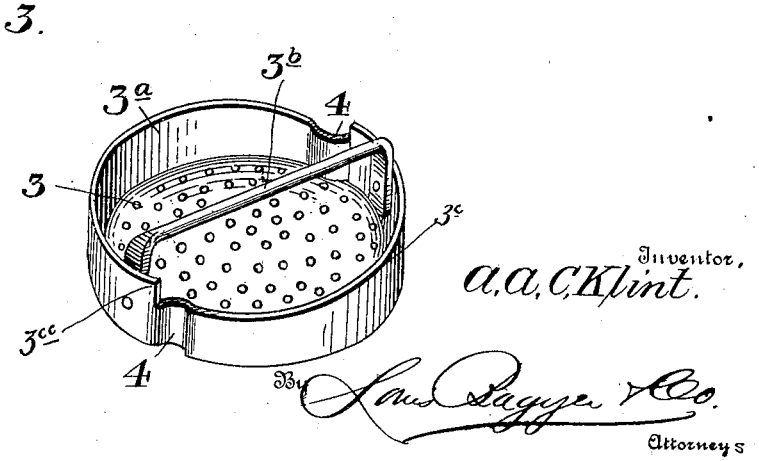
Witnesses
Inventor,
A. A. C. Klint.
Attorneys

UNITED STATES PATENT OFFICE.

AXEL ALBERT CHRISTOFFER KLINT, OF HOLTON, KANSAS.

MILK-STRAINER.

No. 809,115.　　　Specification of Letters Patent.　　　Patented Jan. 2, 1906.

Application filed April 6, 1905. Serial No. 254,132.

*To all whom it may concern:*

Be it known that I, AXEL ALBERT CHRISTOFFER KLINT, a citizen of the United States, residing at Holton, in the county of Jackson and State of Kansas, have invented new and useful Improvements in Milk-Strainers, of which the following is a specification.

My invention relates to improvements in milk-strainers.

It has for its object principally to provide for the ready removal or renewal of the gauze strainer or strainer proper when it has become corroded or otherwise ineffective for further use and to separate or isolate the milk foam from the strainer or screen to prevent the choking or clogging of the strainer and whereby the milk may be poured more rapidly than would under other conditions be possible.

Said invention consists of the structural features of certain parts and the combination of said parts substantially as hereinafter fully and definitely disclosed.

In the accompanying drawings, Figure 1 is a vertical section produced through the preferred embodiment of my milk-strainer. Fig. 2 is a horizontal section taken just above and showing more especially the circular bottom portion of the strainer. Fig. 3 is a disassembled perspective view of the foraminous guard for the strainer or screen.

In the disclosure of my invention, I have shown a handled generally downward tapered receptacle 1, for the reception of the milk or lacteal fluid. Said receptacle has a contracted circular terminal or bottom portion $1^a$ of a suitable depth not only to receive the usual gauze or fine-wire strainer 2, but also a foraminous partition member or diaphragm 3 effective to serve as a guard for said strainer or screen, as will presently more fully appear. Said part $1^a$ has its extreme lower end suitably crimped or formed as to provide upon its inner circumference or surface a horizontal bead or flange $1^b$ for the convenient support of the strainer or screen 2, the latter simply resting thereon, and therefore adapted to be readily removed or renewed when it has become corroded or otherwise rendered ineffective for further use.

The foraminous diaphragm or guard 3 has its exclusive perforated or foraminous area upraised or dished to remove it from direct contact with the effective surface of the strainer or screen for which it serves as a guard, as before noted, the purpose of which is obvious. Said guard has an upstanding annular portion or rim $3^a$ fitting snugly within the circular bottom part $1^a$ of the receptacle 1, and to this rim is suitably fastened or riveted the vertical arms of a bail or handle-bar $3^b$ for the convenient adjustment—*i. e.*, insertion, turning when inserted—and removal of said guard, as occasion may require. Said rim or annular portion $3^a$ has formed upon its top edge cam or inclined surfaces $3^c$, with the eminence or highest point of each beginning at the lowest point or base of the other, whereby are formed at those points vertical shoulders or steps $3^{cc}$, the purpose of which will be presently apparent. Also said rim has indenting its outer surface and extending from top to bottom thereof at the lowest points or bases of the cam-surfaces $3^c$ vertical recesses or notches 4, relatively arranged in a line diagonally crossing the handle-bar or bail $3^b$, therefore being preferably upon opposite sides of the latter, respectively, the purpose of which is apparent. Said recesses or notches 4 are caused as the guard 3 is inserted in place to receive inward-extending projections or studs 5 upon the inner surface of the part $1^a$ at its upper edge, said studs as the guard reaches its lowest position escaping from said recesses or notches, when by suitably turning the guard said studs will ride up and bind upon the inclined or cam surfaces $3^c$, whereby the latter may be effectively secured in position, as also prove effective to hold the strainer or screen in place.

It will be noted that as the foam accumulates as the milk is poured into the receptacle 1 said foam will lodge upon the guard 3, and thus be held back from direct contact with the strainer, the milk, however, passing through the guard to and through the strainer. Consequently said foam, together with any foreign particles or obstacles which might happen to accompany the same, would be excluded from the strainer, and thus prevent the liability of the clogging or choking of the latter, as would otherwise likely occur. Also it will be observed that with the strainer thus guarded or protected the milk may be poured more rapidly into the milk-receptacle than would under other conditions be possible, for the reason that the removal of the clogging action having been effected the milk would flow much more rapidly or freely through the strainer.

Latitude is allowed as to details herein, since they may be changed as circumstances suggest without departing from the spirit of my invention.

I claim—

A device of the character described, comprising a foraminous strainer-guard with its rim or wall practically constituting two semicircular members one in continuation of the other, said members having their upper edges forming opposite inclines with their perpendicular edges or elevations opposed to their bases, respectively, said members also being bodily deflected or bent inward into lateral recesses, and a fixed handle-bar or bail whose points of connection with said members are arranged upon opposite sides of the bases of said members, respectively, in combination with a receptacle having an annular portion effective to receive said strainer, and having inward-extended headed studs adapted to ride upon the edges of said members and to enter said recesses.

In testimony whereof I affix my signature in presence of two subscribing witnesses.

AXEL ALBERT CHRISTOFFER KLINT.

Witnesses:
 J. T. HOLLIS,
 J. E. LOVE.